United States Patent Office 3,059,643
Patented Oct. 23, 1962

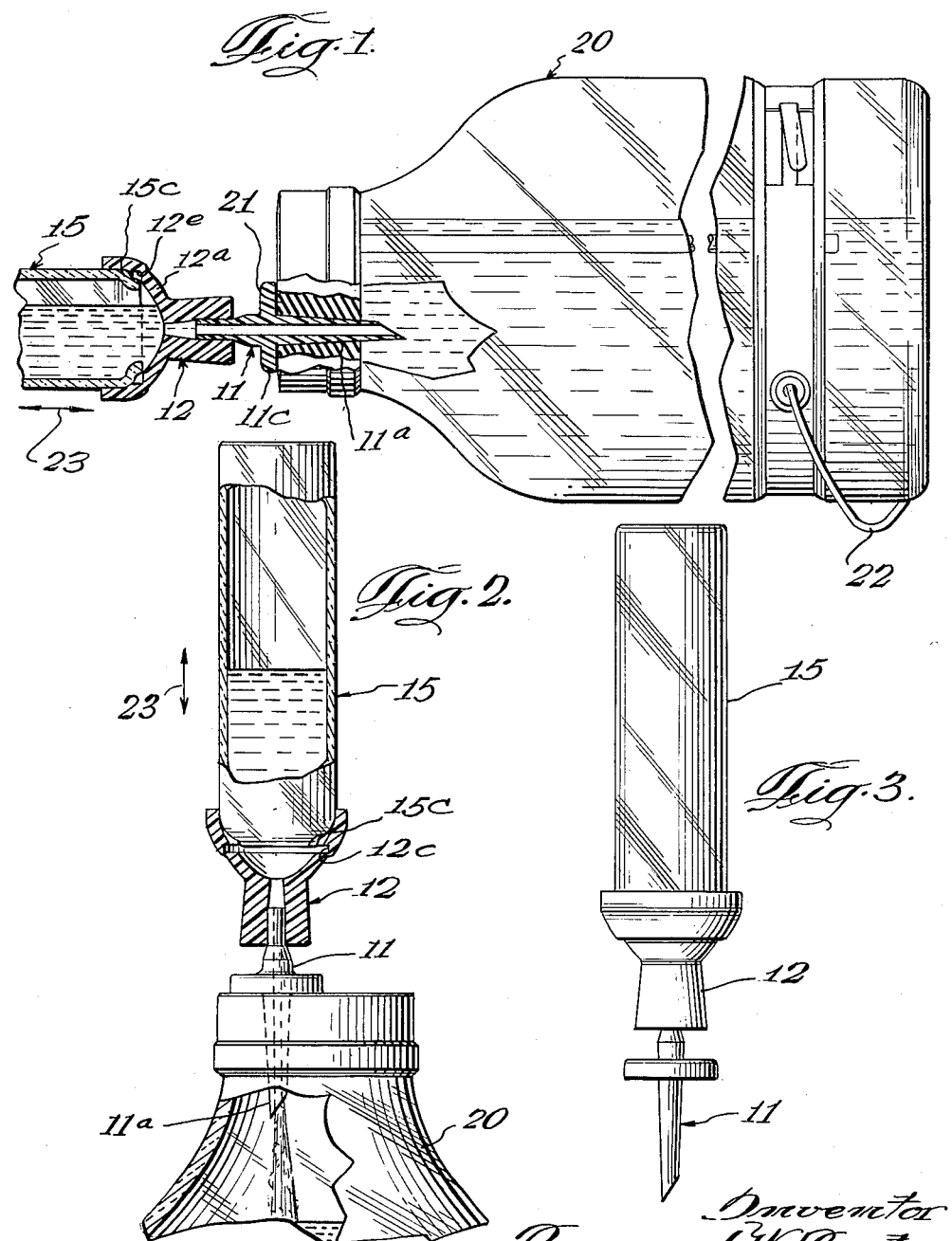

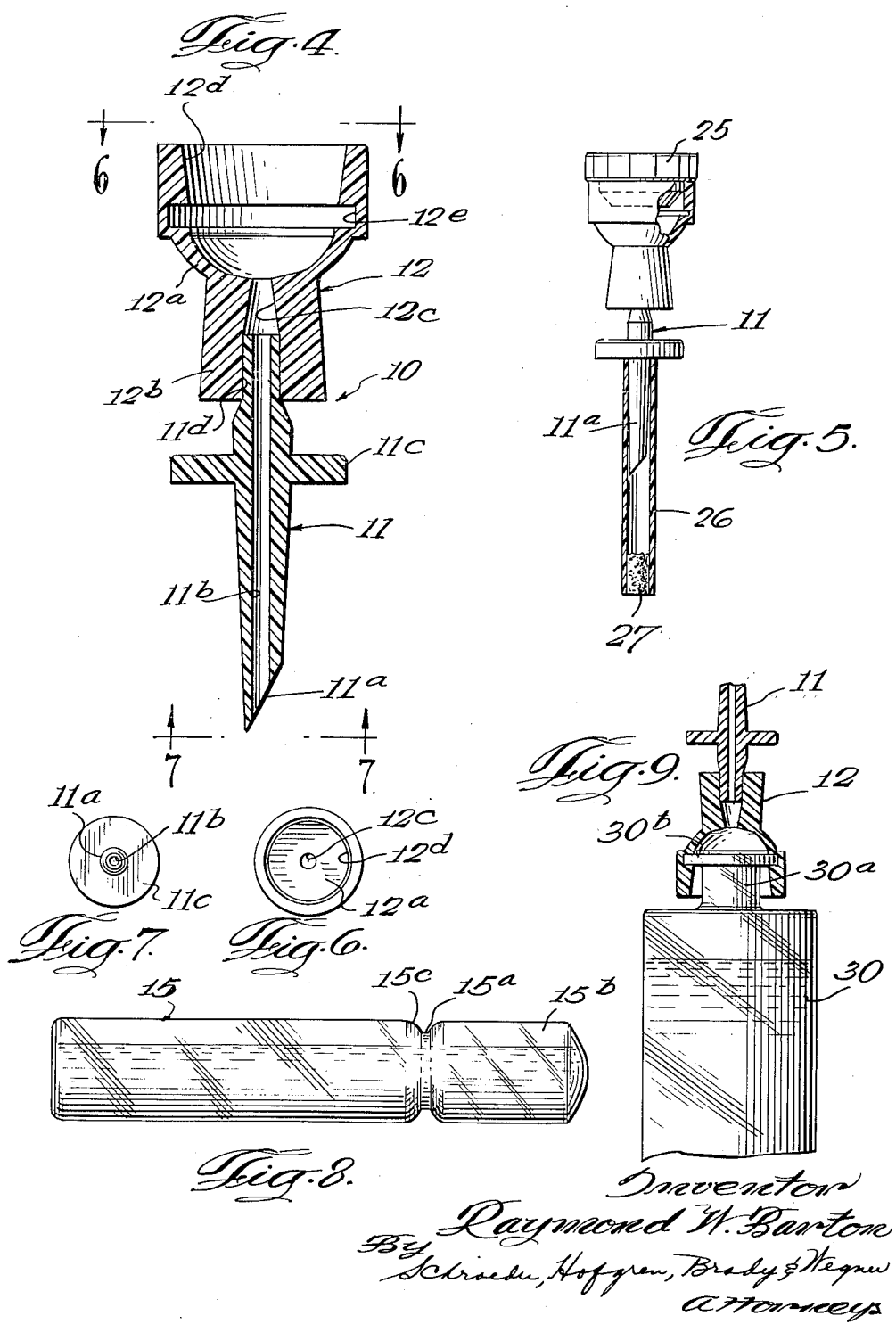

3,059,643
PUMPING APPARATUS
Raymond W. Barton, Evansville, Ind., assignor, by mesne assignments, to Baxter Laboratories, Inc., Morton Grove, Ill., a corporation of Delaware
Filed Dec. 10, 1954, Ser. No. 474,475
7 Claims. (Cl. 128—272)

This invention is concerned with an apparatus and method for preparing solutions and more particularly with an apparatus and method for preparing, under aseptic conditions, a solution for injection.

Many solutions which are used by the medical profession for injection deteriorate rapidly after preparation and must be mixed in relatively small quantities at the time of use. Such solutions are often prepared from a large quantity of liquid in a parenteral bottle and a small vial or bottle of additive substance which may be either a liquid or a solid. For example, a solution of sodium pentothal in a sodium chloride injection liquid must be prepared in this manner at the time of using. Several methods, some involving expensive specialized equipment, are presently used in preparing such solutions. With presently used methods, however, the solution is often contaminated by the admission of unfiltered air or complicated by the use of expensive, hard to sterilize equipment.

I have devised and disclose and claim herein, a novel, inexpensive pumping apparatus and method by means of which such solutions may be prepared in an aseptic, evacuated system.

One feature of the invention is the provision of an apparatus for preparing a sterile injection solution comprising an evacuated dispensing container of an injection liquid, a container of material adapted to become a desired solute in the liquid and means for transferring the solute material to the dispensing container while maintaining a closed evacuated system. Another feature is that the means for transferring the solute material comprise pump means including a bottle adaptor for communication with the liquid in the dispensing container and a pump member having an open end adapted to receive the open end of the solute material container, for pumping liquid directly into the solute material container and for returning the solution to the dispensing container.

A further feature is the provision of a pumping device comprising a bottle adaptor having an end portion adapted for communication with a container of liquid and having a flow passage therethrough, and a pump member in communication with a flow passage and having a portion adapted to communicate with a solute material container, the pump causing withdrawal of liquid from and return of solution to the liquid container. Still another feature is that the pump member is cup-shaped and has a resilient closed end portion in communication with a flow passage of the bottle adaptor and an open end portion adapted to receive the open end of the solute material container, deformation of the closed end of the pump causing withdrawal of liquid from and return of liquid to the liquid container.

Still another feature is the method of preparing a solution for injection from a quantity of liquid in a dispensing container and a quantity of solute material in a solute material container which comprises transferring a portion of the liquid from the dispensing container directly into the solute material container, mixing the solute material with the portion of liquid and returning the resulting solution to the dispensing container. And a further feature is that the dispensing container is evacuated and a closed aseptic system is maintained during the mixing operation.

Further features and advantages will readily be apparent from the following specification and from the drawings, in which:

FIGURE 1 is a fragmentary elevational view partially in section, showing one step in the preparation of the solution;

FIGURE 2 is a view similar to FIGURE 1 showing another step in the preparation of the solution;

FIGURE 3 is an elevational view of the pumping apparatus and solute material container;

FIGURE 4 is a longitudinal sectional view of the pumping apparatus;

FIGURE 5 is a reduced elevational view, partially in section, showing the sterile packaging of the pumping apparatus;

FIGURE 6 is a view taken along line 6—6 of FIGURE 4;

FIGURE 7 is a view taken along line 7—7 of FIGURE 4;

FIGURE 8 is a side view of a solute material container; and

FIGURE 9 is a fragmentary view, partially in section, of another form of solute material container with the pumping apparatus attached thereto.

The solutions, the preparation with which we are concerned herein, are often, if not usually, prepared from a quantity of liquid in a parenteral or dispensing container and a small container as a bottle, vial or ampule of a material adapted to become a desired solute. Dispensing containers for administering parenteral fluids are normally evacuated and are provided with tightly sealed resilient stoppers through which suitable administration equipment as a drip meter and an air filter may be connected. Such containers are generally of a large size, often holding 500 or 1000 cc. The additive material, which is generally a powder but may be a liquid in some cases, is usually packaged in a small, non-evacuated sterile container.

Various procedures are presently followed in preparing a solution from the liquid in the parenteral or dispensing container and the additive, or solute material, in the small container.

One practice is to remove the stopper from the parenteral container and merely pour the solute material in, the stopper being replaced before the solution is dispensed. This has a number of disadvantages, the principal one being that the solution may be contaminated by the admission of unfiltered air to the dispensing container. In addition, special equipment is necessary to remove the stoppers of most parenteral containers.

Another procedure is to utilize a hypodermic syringe to withdraw a portion of the liquid from the paranteral container and transfer it to the small container where it is mixed with the solute material. The resulting solution is then returned, by means of the syringe, to the parenteral container. The repeated passage of the hypodermic needle through the stopper of the parenteral bottle has the effect of weakening it and may cause particles of the stopper to break away and contaminate the solution. Furthermore, it is necessary to have a sterile syringe and needle available whenever it is desired to prepare a solution.

A double ended needle may be used in adding a small bottle of liquid solute to the dispensing container by first inserting one end of the needle through the stopper of the small bottle and then inserting the other end through the stopper of the evacuated parenteral bottle. The difference in pressure in the two containers causes the solute to flow into the large container. This arrangement will of course not work with an ampule of liquid nor with a powdered or solid solute material. In addition, double-ended needles are relatively expensive.

Referring now to the drawings, a pumping unit 10 is provided which includes a bottle adaptor 11 and a pump member 12. The bottle adaptor has an elongated tubular configuration and is provided with a sharpened end portion 11a. A bore or flow passage 11b extends through the bottle adaptor. A flange 11c encircles the adaptor intermediate the ends thereof. The pump member 12 is generally cup-shaped and has a closed end portion 12a provided with an outwardly extending boss 12b through which an opening 12c is formed in which the end 11b of the bottle adaptor is received. The open end portion 12d of the pump member is adapted to receive and sealingly engage with the open end of a solute material container and is preferably tapered so as to be usable with containers of various sizes. An annular channel 12e is provided in the interior wall of the pump member, adjacent end portion 12a. This channel is adapted to receive the flanged rim of those solute material containers which may be so provided.

Assuming that it is desired to prepare a sterile solution by adding a solid or powdered solute material in ampule 15 to a liquid in parenteral dispensing container 20, the pumping apparatus 10 may be utilized in the following manner. The ampule is opened by scoring the reduced neck portion 15a of the shell and breaking off the end 15b. The open end portion 15c of the ampule is immediately inserted into the open end 12d of pump member 12. The sharpened end portion 11a of the bottle adaptor is then forced through the outlet opening of the rubber stopper 21 which closes the parenteral liquid container 20, the operator grasping the flange 11c of the bottle adaptor. The parenteral bottle 20 is then placed on its side as shown in FIGURE 1 or suspended in an inverted position by means of bail 22 and the pump 12 operated to withdraw liquid from the container 20 and transfer it directly into the solute material container 15.

The closed end wall 12a of the pump is of extremely resilient material so that it may be readily deformed by a reciprocatory movement of the solute material container 15, as indicated by arrow 23, causing the pumping action.

After a portion of the liquid in the parenteral container 20 has been transferred to the solute material container 15, the solute material container may be agitated to mix the liquid and solute material forming a concentrated solution. The parenteral bottle 20 is then returned to an upright position, FIGURE 2, and the pumping operation repeated transferring the concentrated solution back to the parenteral bottle where it is diluted by the balance of the injection liquid.

This operation may be repeated several times if necessary before all of the solute material is dissolved.

After the preparation of the solution has been completed, a suitable air filter (not shown) should be inserted through the stopper 21 of the parenteral bottle to relieve the vacuum therein preventing contamination of the contents on removal of the pumping apparatus and attached solute material container. Suitable dispensing apparatus (not shown) may be inserted into the outlet opening of the stopper 21 after the bottle adaptor 11 is removed and the solution then withdrawn for use. Reference may be had to Barton Patent 2,568,108 for details of the structure and use of a suitable air filter and dispensing apparatus.

The pumping apparatus 10 is preferably packaged in a sterile manner so that it is ready for use by the consumer. Referring to FIGURE 5, it is seen that a removable stopper 25 is inserted into the open end 12d of the cup-shaped pump member 12 and a plastic sleeve 26 is slipped over the pointed end portion 11a of the bottle adaptor 11. The end of the sleeve 26 may be filled with a porous filter material, as a wad of cotton 27.

FIGURE 9 shows a bottle 30 of the type often used with a liquid solute material and which has a neck 30a provided with an outturned flange 30b. Flange 30b is engaged in channel 12e of pump member 12 holding the parts together during the mixing operation.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In an apparatus for use in preparation of an injection solution by the dissolution of a quantity of medicament additive material, in an additive container, into a quantity of parenteral liquid in a dispensing container having a penetrable stopper of a resilient material, the improved additive container assembly connectable with said dispensing container through penetration of said stopper, comprising: an elongated tubular dispensing container adaptor having a rigid, pointed stopper-puncturing end portion and having a flow passage extending longitudinally therethrough; a cup-shaped pump having a closed end portion of resilient material, readily deformable axially of the pump, and with a centrally located, axially extending opening through said closed end portion connected with the end of said adaptor opposite said pointed end portion, said pump having an open end portion spaced axially of the pump from said opening; and an additive material container connected with the open end of said pump and having an axis, the axes of said tubular adaptor, cup-shaped pump and additive material container being generally aligned, axial reciprocation of said additive container relative to said adaptor deforming the closed end portion of said pump, to vary the volume enclosed by the pump and additive container thereby effecting a pumping action.

2. In an apparatus for use in the preparation of an injection solution by the dissolution of a quantity of medicament additive material, in an additive container, into a quantity of parenteral liquid in a dispensing container having a penetrable stopper, the improved additive container assembly connectable with said dispensing container through penetration of said stopper, comprising: an elongated tubular dispensing container adaptor having a rigid, pointed stopper-puncturing end portion and having a flow passage extending longitudinally therethrough; a cup-shaped pump having a resilient, readily deformable closed end portion with a centrally located opening therethrough connected with the end of said adaptor opposite said pointed end portion, said pump having an open end portion spaced axially of the pump from said opening; an additive material container connected with the open end of said pump and having an axis generally coaxial with the axis of said cup-shaped pump and of said tubular adaptor; and an enlarged flange-like portion on said adaptor, intermediate the ends thereof and extending outwardly therefrom generally transversely of the adaptor axis.

3. In an apparatus for use in the preparation of an injection solution by the dissolution of a quantity of medicament additive material, in an additive container, into a quantity of parenteral liquid in a dispensing container having a penetrable stopper, the improved additive container assembly connectable with said dispensing container through penetration of said stopper, comprising: an elongated tubular dispensing container adaptor having a rigid, pointed stopper-puncturing end portion and having a flow passage extending longitudinally therethrough; a cup-shaped pump having a resilient, readily deformable closed end portion with a centrally located opening therethrough connected with the end of said adaptor opposite said pointed end portion, said pump having an open end portion spaced axially of the pump from said opening; an additive material container connected with the open end of said pump and having an axis generally coaxial with the axis of said cup-shaped pump and of said tubular adaptor; and an enlarged, manually-engageable projection extending outwardly from said tubular adaptor intermediate the ends thereof.

4. In an apparatus for use in the preparation of an injection solution by the dissolution of a quantity of medicament additive material, in an additive container, into a quantity of parenteral liquid in a dispensing container having a penetrable stopper, the improved additive container asembly connectable with said dispensing container through penetration of said stopper, comprising: an elongated tubular dispensing container adaptor having a rigid, pointed stopper-puncturing end portion and having a flow passage extending longitudinally therethrough; a cup-shaped pump having a resilient, readily deformable closed end portion with a centrally located opening therethrough connected with the end of said adaptor opposite said pointed end portion, said pump having an open end portion spaced axially of the pump from said opening; an additive material container connected with the open end of said pump having an axis generally coaxial with the axis of said cup-shaped pump and of said tubular adaptor forming with said pump and adaptor an additive container assembly; and an enlarged manually-engageable projection extending outwardly from said assembly intermediate the deformable end portion of said pump and said stopper-puncturing adaptor end portion.

5. In the combination of an additive container and the parenteral solution container having a penetrable stopper through which additive material is introduced from the additive container to a parenteral container, the improvement which comprises an additive container of the character described, comprising: an elongated tubular dispensing container adaptor having a rigid, pointed stopper-puncturing end portion and having a flow passage extending longitudinally therethrough; a cup-shaped pump having a resilient, readily deformable closed end portion with a centrally located opening therethrough connected with the end of said adaptor opposite said pointed end portion, said pumps having an open end portion spaced axially of the pump from said opening; an additive material container connected with the open end of said pump and having an axis generally coaxial with the axis of said cup-shaped pump and of said tubular adaptor; and an enlarged flange-like portion on said adaptor, intermediate the ends thereof and extending outwardly therefrom generally transversely of the adaptor axis.

6. In the combination of an additive container and a parenteral solution container having a penetrable stopper through which additive material is introduced from the additive container to the parenteral container, the improvement which comprises an additive container of the character described, including: an elongated tubular dispensing container adaptor having a rigid, pointed stopper-puncturing end portion and having a flow passage extending longitudinally therethrough; a cup-shaped pump having a resilient, readily deformable closed end portion with a centrally located opening therethrough connected with the end of said adaptor opposite said pointed end portion, said pump having an open end portion spaced axially of the pump from said opening; and an additive material container connected with the open end of said pump and having an axis generally coaxial with the axis of said cup-shaped pump and of said tubular adaptor.

7. A parenteral solution additive container of the character described, comprising: an elongated tubular dispensing container adaptor having a rigid, pointed stopper-puncturing end portion and having a flow passage extending longitudinally therethrough; a cup-shaped pump having a resilient, readily deformable closed end portion with a centrally located opening therethrough connected with the end of said adaptor opposite said pointed end portion, said pump having an open end portion spaced axially of the pump from said opening; an additive material container connected with the open end of said pump and having an axis generally coaxial with the axis of said cup-shaped pump and of said tubular adaptor; and an enlarged flange-like portion on said adaptor, intermediate ends thereof and extending outwardly therefrom generally transversely of the adaptor axis.

References Cited in the file of this patent

UNITED STATES PATENTS

| | | |
|---|---|---|
| 2,263,890 | Salvesen | Nov. 25, 1941 |
| 2,393,322 | Houghton | Jan. 22, 1946 |
| 2,494,456 | Still | Jan. 10, 1950 |
| 2,549,417 | Brown | Apr. 17, 1951 |
| 2,568,029 | Seemar | Sept. 18, 1951 |
| 2,580,836 | Rausch | Jan. 1, 1952 |
| 2,584,397 | Pitman | Feb. 5, 1952 |
| 2,661,743 | Archer | Dec. 8, 1952 |
| 2,704,544 | Ryan | Mar. 22, 1955 |
| 2,789,734 | Biederman | Apr. 23, 1957 |

FOREIGN PATENTS

| | | |
|---|---|---|
| 1,010,029 | France | Mar. 12, 1952 |
| 570,449 | Great Britain | July 6, 1945 |